United States Patent Office 3,221,030
Patented Nov. 30, 1965

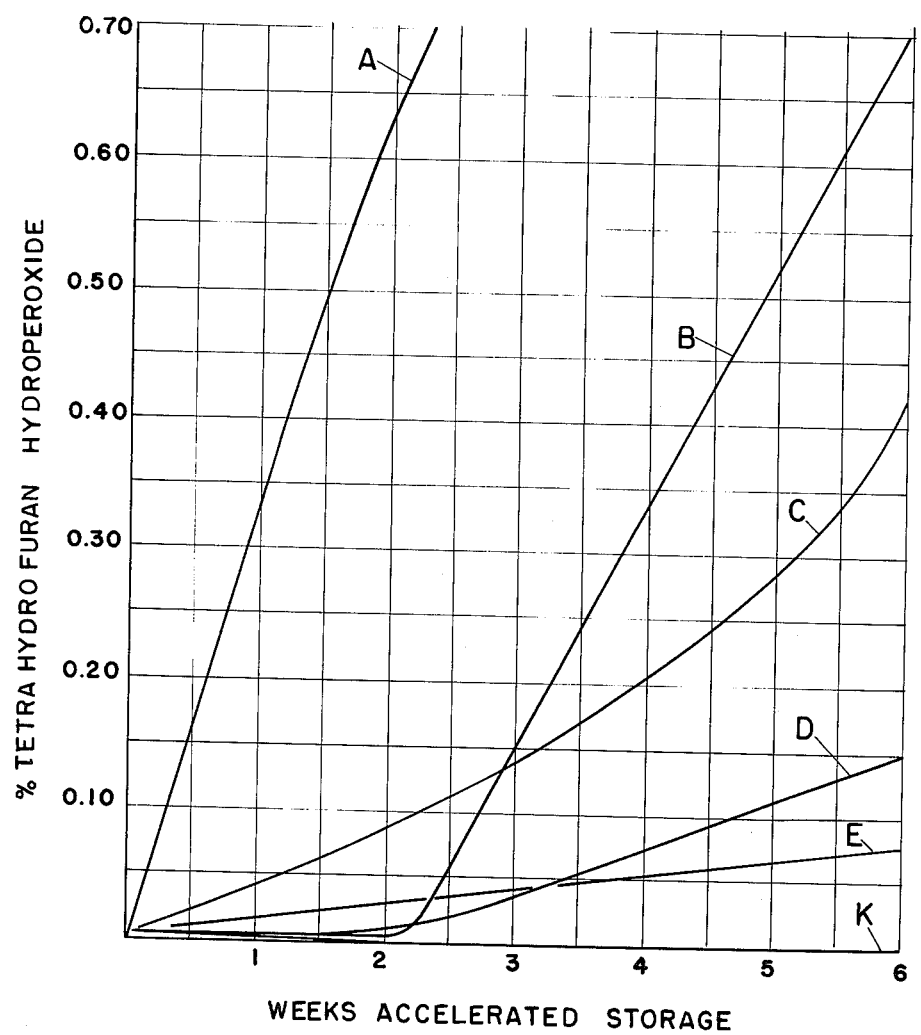

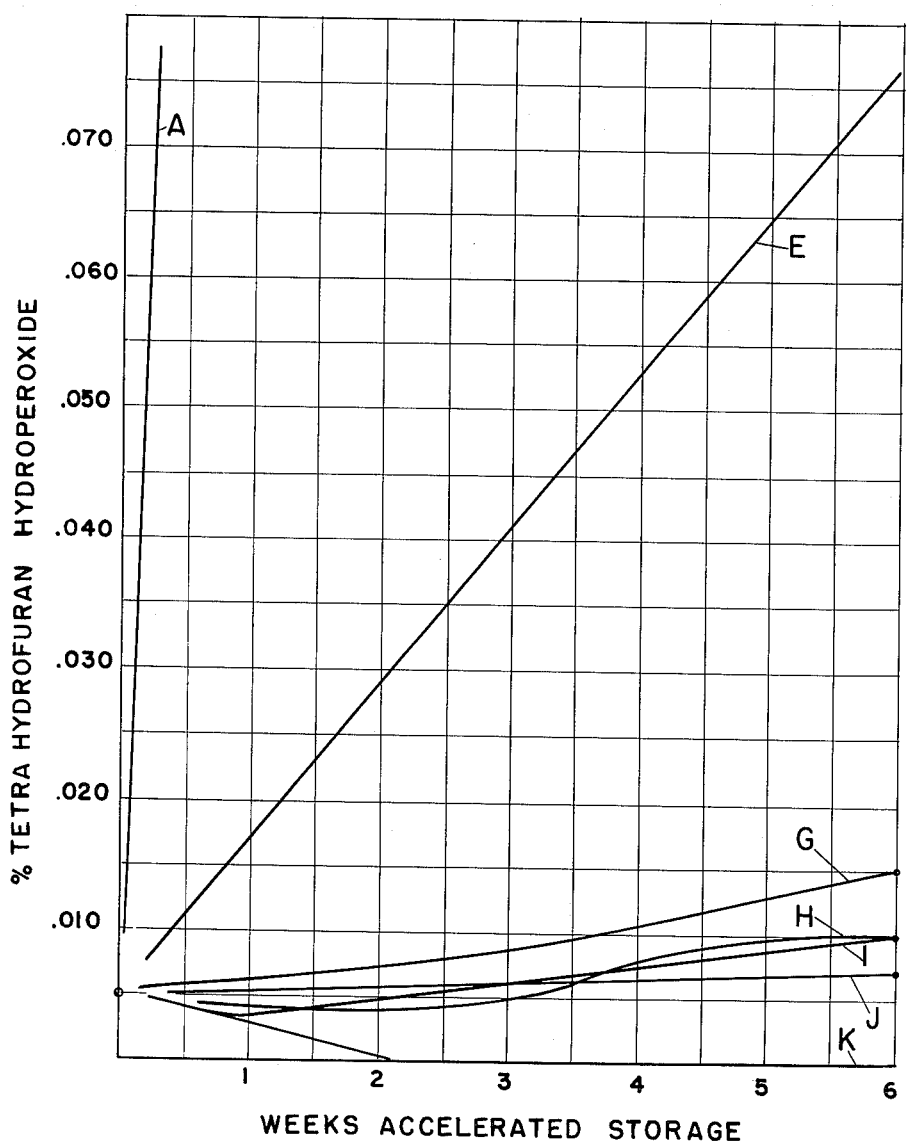

3,221,030
STORAGE-STABLE PEROXIDE-FREE TETRAHYDROFURAN AND METHOD FOR PREPARING SAME
George W. Huffman, Crystal Lake, Ill., assignor to The Quaker Oats Company, Chicago, Ill., a corporation of New Jersey
Filed Apr. 9, 1963, Ser. No. 271,642
4 Claims. (Cl. 260—346.1)

This invention relates to a new and improved storage-stable peroxide-free tetrahydrofuran composition and method for producing same.

Many additives including hydroquinone, p-cresol, hydrazine, substituted tertiary amines, substituted phenols, and trialkyl phosphites have been proposed for destroying peroxides and/or arresting peroxide development in tetrahydrofuran. Some of these additives stabilize the tetrahydrofuran without reducing the peroxide levels. Some destroy the peroxides and for a time stabilize the peroxide level at or near zero. None, however, have been found to provide storage-stable peroxide-free tetrahydrofuran.

It is an object of this invention to provide a highly effective additive system for destroying and preventing peroxide in tetrahydrofuran.

It is another object of this invention to provide an improved storage-stable peroxide-free tetrahydrofuran composition.

It is also an object of this invention to provide a tetrahydrofuran composition which can be used without repurification in reactions or processes in which peroxides are harmful, even after prolonged shipping and storage.

These and other objects which will become apparent hereinafter are obtained in accordance with this invention by incorporating in tetrahydrofuran an amount of sodium borohydride greater than 0.0001% by weight, based on the weight of the tetrahydrofuran and an amount of tri(nonylated phenyl)phosphite greater than about 0.001% by weight, based on the weight of the tetrahydrofuran.

Insofar as these components of the additive system have no known adverse effect on tetrahydrofuran, there are no upper limits on the amounts employed. Higher peroxide levels require incorporation of larger amounts of additives. However, economic considerations make it less desirable to add large quantities of additives. Therefore, when starting with tetrahydrofuran which has a high peroxide level, e.g. 0.5%, economic considerations usually make it preferable to use some classical method such as caustic distillation to provide comparatively pure tetrahydrofuran for use in accordance with this invention.

A preferred composition is produced in accordance with this invention by incorporating in tetrahydrofuran an amount of sodium borohydride between 0.002 and 0.01% by weight, based on the weight of the tetrahydrofuran, and an amount of tri(nonylated phenyl)phosphite between 0.05 and 0.2% by weight, based on the weight of the tetrahydrofuran. The tri(nonylated phenyl)phosphite component may be a pure compound or it may be a mixture of tri(nonylated phenyl)phosphites.

This invention will be illustrated but is not limited by the following example, in which the percentages given are percent by weight based on the weight of the tetrahydrofuran.

EXAMPLE

Freshly prepared tetrahydrofuran (600 ml.) was placed in each of ten 2-liter flasks. Additives were admixed therewith in various amounts. The level of additive used in this series of tests was either 0.10% or was that level which would give approximately the same composition cost as 0.025% BHA, whichever level was lower. All compositions were then subjected to the following accelerated storage procedure:

Each flask is fitted with an aluminum foil covered stopper fitted with a bent capillary tube. The capillary tube is about four inches long. Each flask is allowed to stand at room temperature in a room illuminated by diffused sunlight. The contents are not subjected to stirring after preparation. (Note that there is approximately 1400 ml. of air space over the sample at the start of the procedure. The purpose of the capillary is to connect the air space with the air outside the flask.)

At weekly intervals aliquots of each sample were removed for peroxide analysis according to the following procedure:

(1) Place 100 ml. of distilled water in each of two flasks.

(2) To each flask add 25 ml. of a 1:4 (volumetric) mixture of concentrated sulfuric acid and water. Add 25 ml. of 10% potassium iodide solution.

(3) Add a 25 ml. aliquot of tetrahydrofuran to one of the flasks. Stopper both flasks and shake, and place in the dark for 15 to 20 minutes.

(4) Titrate the contents of each flask with 0.02 N sodium thiosulfate until the solutions become colorless.

(5) Determine the peroxide content (as tetrahydrofuran hydroperoxide) in the tetrahydrofuran sample as follows.

Percent peroxide=0.23 (ml. thiosulfate in sample minus ml. thiosulfate in blank) (normality of thiosulfate)

Table I below shows the amounts of peroxide found at the end of six weeks' accelerated storage in the various compositions tested using various additives in various amounts by weight of the tetrahydrofuran:

Table I

| Composition | Additive | Amount Additive percent | Amount Peroxide percent |
|---|---|---|---|
| B | Tributyl Phosphite | 0.10 | .706 |
| C | Triphenyl Phosphite | 0.10 | |
|   | Sodium Borohydride | 0.005 | .425 |
| D | Polygard | 0.10 | .149 |
| E | Bisphenol A | 0.10 | .076 |
| G | Naugatuck 423 | 0.08 | .015 |
| H | BHT | 0.10 | .010 |
| I | BHA | 0.025 | .010 |
| J | Topanol A | 0.10 | .007 |
| K | Polygard | 0.10 | |
|   | Sodium Borohydride | 0.005 | .000 |

A control composition (A) containing no additive was similarly tested and found to contain 0.826% peroxide at the end of only three weeks of accelerated storage. The additives set forth in Table I are identified as follows: Naugatuck 423 is essentially bis(3-methyl-4-hydroxy-5-tert.butyl benzyl) sulfide. BHT is commercial butylated hydroxytoluene. BHA refers to commercial butylated hydroxyanisole. Topanol A is essentially 2,4-dimethyl-6-tert.butylphenol. Polygard is essentially a mixture of tri(nonylated phenyl)phosphites. Bisphenol A is well known in the art. Of the compositions set forth in Table I, only composition K is representative of this invention.

FIGURES 1 and 2 show the peroxide content of the same compositions over the entire period of the accelerated storage, the designation of the curves being the same as described above. Curve A (no additive) shows the greatest amount of peroxide development in the shortest time. Tributyl phosphite produced a stabilizing effect for two weeks but permitted dangerous levels of peroxide to develop rapidly thereafter, as is illustrated in curve B. It is clear that Polygard by itself (curve D) did not produce the results obtained by the process of this invention, nor did a combination of sodium borohydride and triphenyl phosphite (curve C). Bisphenol A likewise permitted development of considerable quantities of peroxide (curve E). Curve E is included on both FIGURE 1 and FIGURE 2. This is done to illustrate the effect of increasing the scale in FIGURE 2. Two figures are presented rather than one to avoid crowding at the bottom of FIGURE 1. Curves G, H, I and J show that the results obtained using Naugatuck 423, BHT, BHA and Topanol A were better in the long run than the additives employed in compositions B to E in regard to stabilizing peroxides in tetrahydrofuran. However, only composition K still had a zero peroxide level at the end of the test. This composition K is the composition which was prepared in accordance with this invention.

Hence the invention provides an improved storage-stable peroxide-free tetrahydrofuran composition which is superior to prior art compositions. This invention thereby provides a considerable and unexpected advancement over the prior art.

I claim:

1. Tetrahydrofuran containing between about 0.001% and 0.2% by weight tri(nonylated phenyl)phosphite and between about 0.0001% and 0.01% by weight sodium borohydride.

2. Tetrahydrofuran containing between about 0.05% and 0.2% by weight tri(nonylated phenyl)phosphite and between about 0.002 and 0.01% by weight sodium borohydride.

3. A method for producing a storage-stable peroxide-free tetrahydrofuran composition comprising incorporating in tetrahydrofuran an amount of sodium borohydride between about 0.0001% and 0.01% by weight and an amount of tri(nonylated phenyl)phosphite between about 0.001% and 0.2% by weight.

4. A method for producing a storage-stable peroxide-free tetrahydrofuran composition comprising incorporating in tetrahydrofuran an amount of sodium borohydride between about 0.002% and 0.01% by weight and an amount of tri(nonylated phenyl)phosphite between 0.05% and 0.2% by weight.

References Cited by the Examiner
UNITED STATES PATENTS

| | | | |
|---|---|---|---|
| 2,957,023 | 10/1960 | Dimler et al. | 260—632.5 |
| 3,074,967 | 1/1963 | Brillhart | 260—346.1 |
| 3,104,254 | 9/1963 | Reetz | 252—400 |

NICHOLAS S. RIZZO, *Primary Examiner.*